Aug. 26, 1947.  I. P. RODMAN  2,426,241
PHONOGRAPH RECORDING AND REPRODUCING SYSTEM
Filed Feb. 11, 1943  6 Sheets-Sheet 1
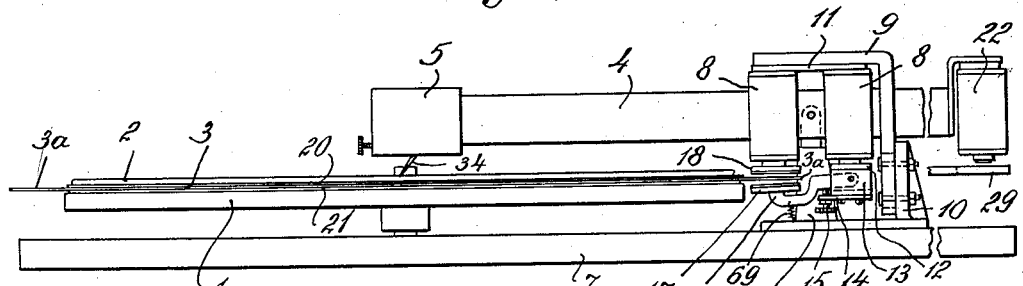
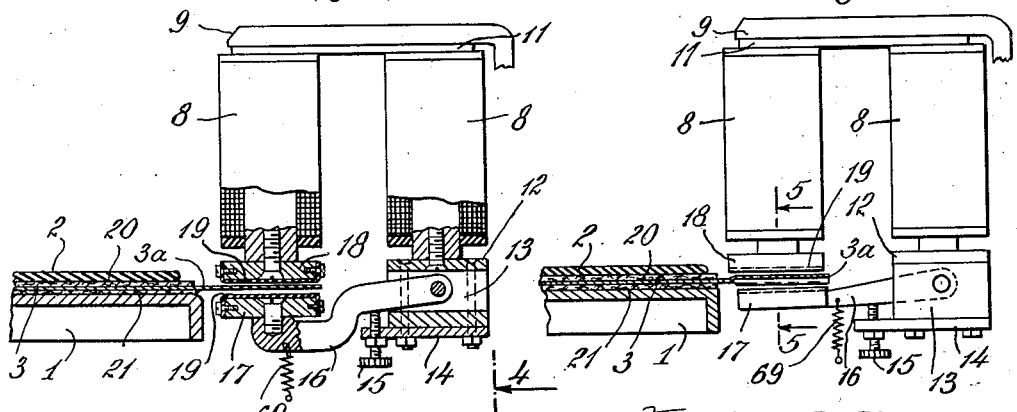
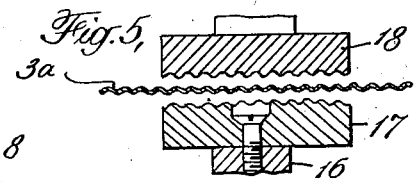
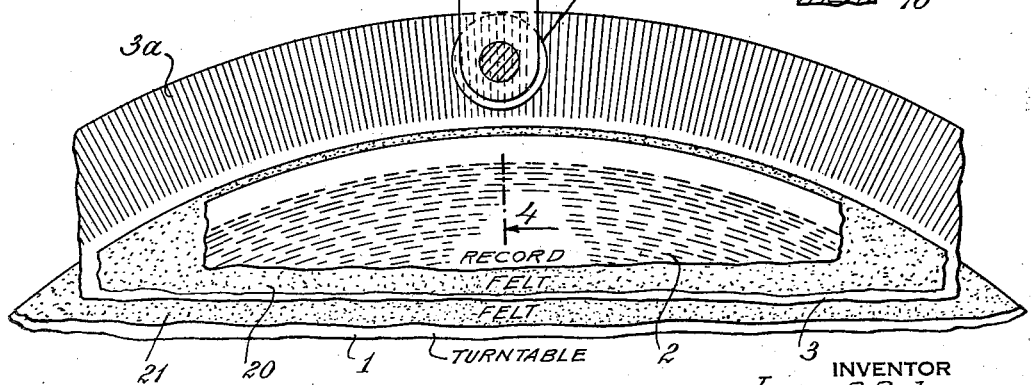
INVENTOR
*Isaac P. Rodman*
BY
*Pennie, Davis, Marvin & Edmonds.*
ATTORNEYS Aug. 26, 1947. I. P. RODMAN 2,426,241
PHONOGRAPH RECORDING AND REPRODUCING SYSTEM
Filed Feb. 11, 1943 6 Sheets-Sheet 2
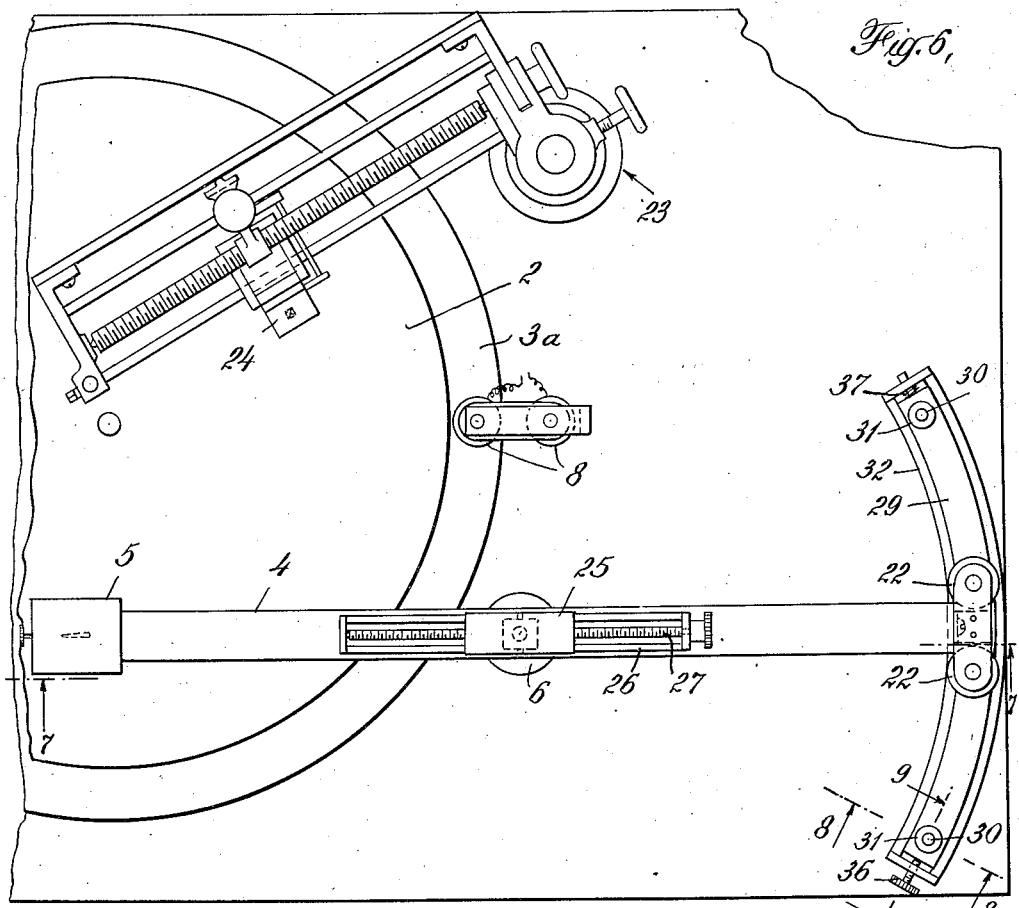
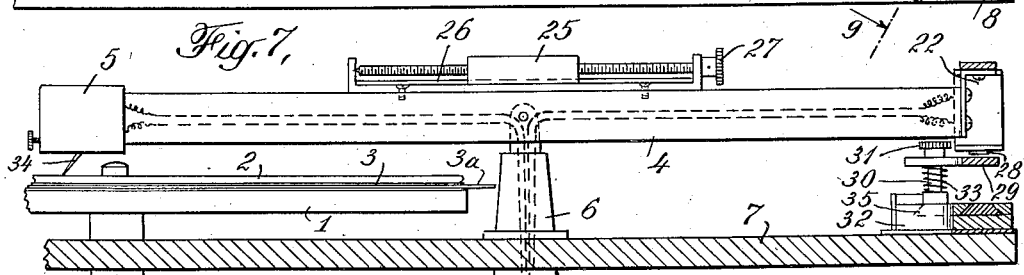
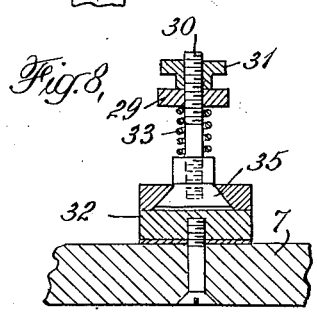
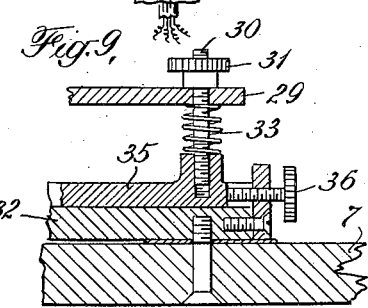
INVENTOR
Isaac P. Rodman
BY Pennie, Davis,
Marvin and Edmonds.
ATTORNEYS Aug. 26, 1947.   I. P. RODMAN   2,426,241
PHONOGRAPH RECORDING AND REPRODUCING SYSTEM
Filed Feb. 11, 1943   6 Sheets-Sheet 3
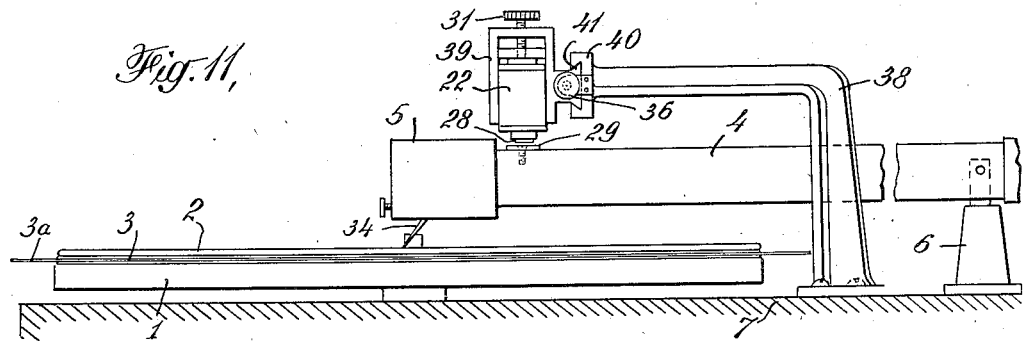
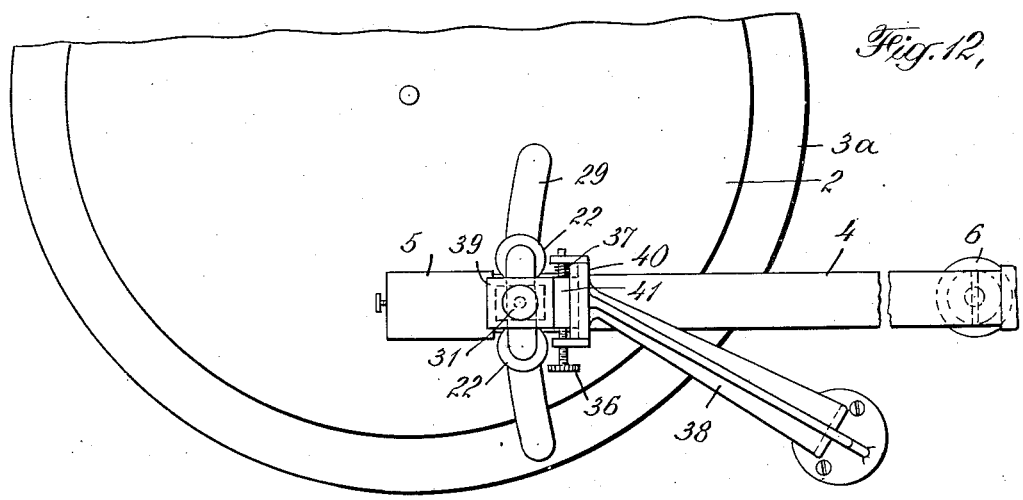
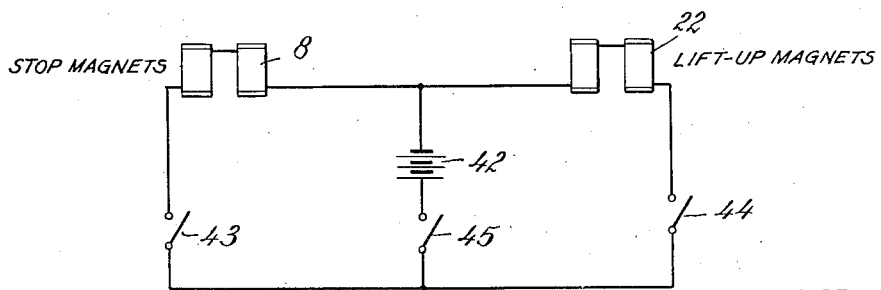
INVENTOR
Isaac P. Rodman
BY
Pennie, Davis, Marvin & Edmonds.
ATTORNEYS Aug. 26, 1947.　　　I. P. RODMAN　　　2,426,241
PHONOGRAPH RECORDING AND REPRODUCING SYSTEM
Filed Feb. 11, 1943　　　6 Sheets-Sheet 4
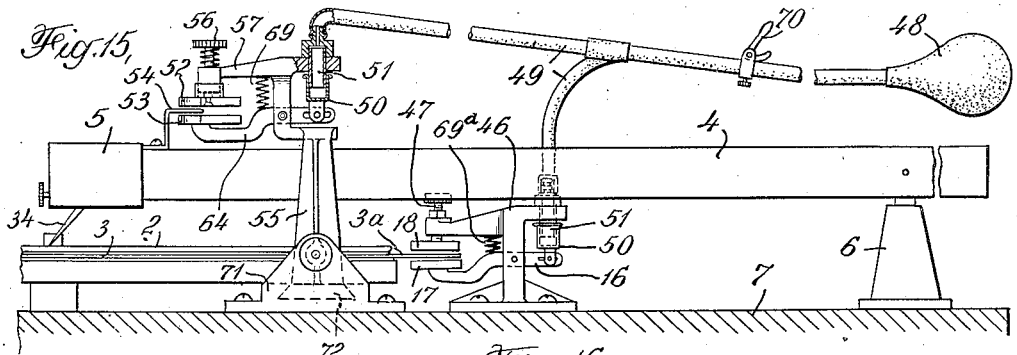
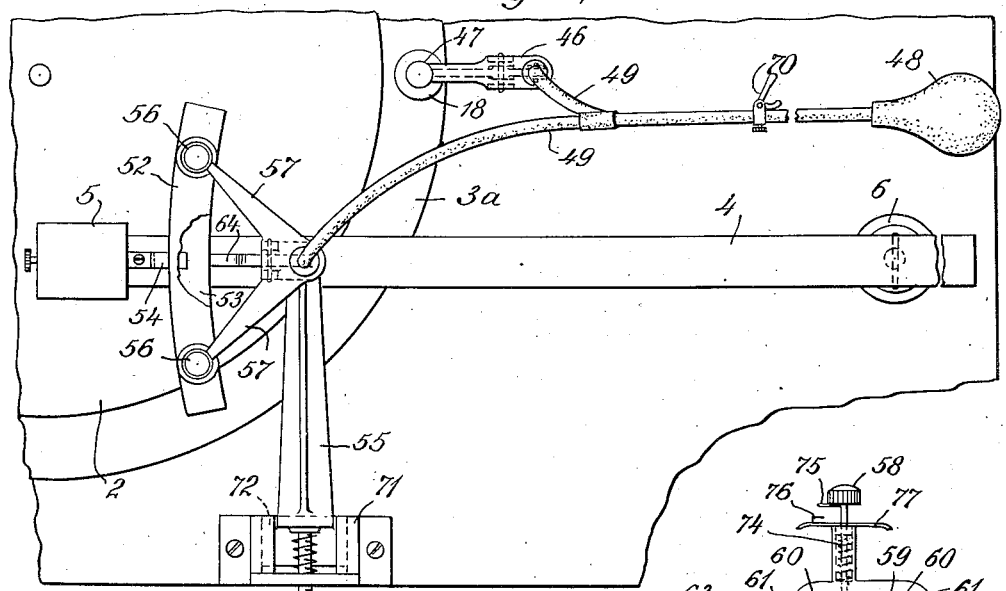
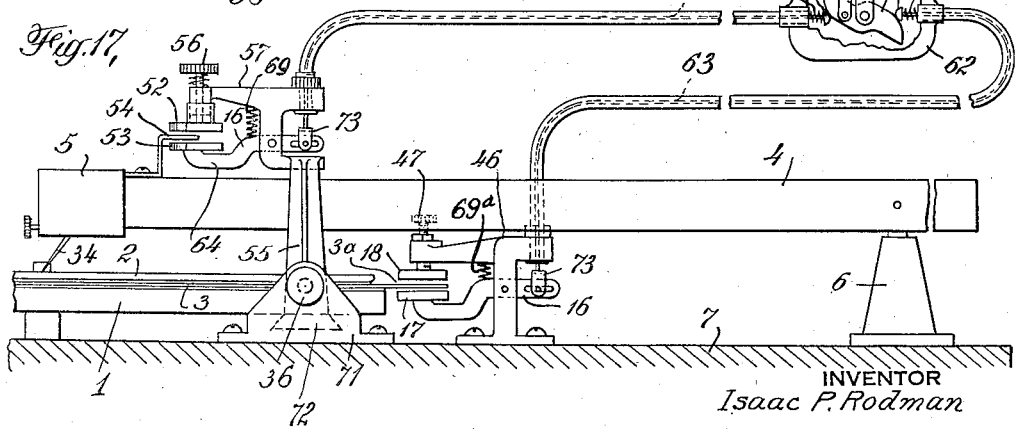
INVENTOR
Isaac P. Rodman
BY
Pennie, Davis, Marvin & Edmonds
ATTORNEYS

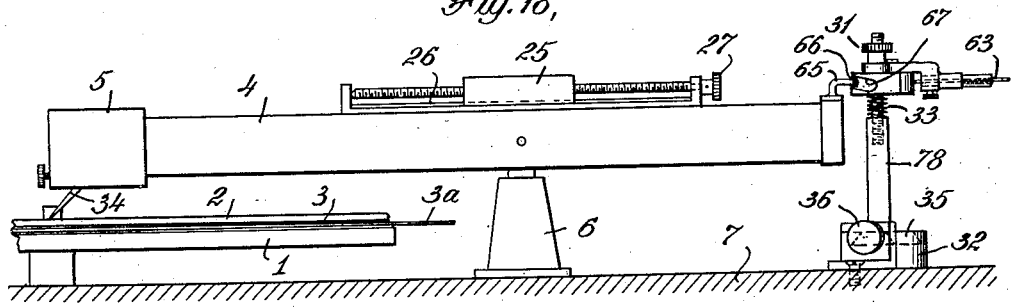
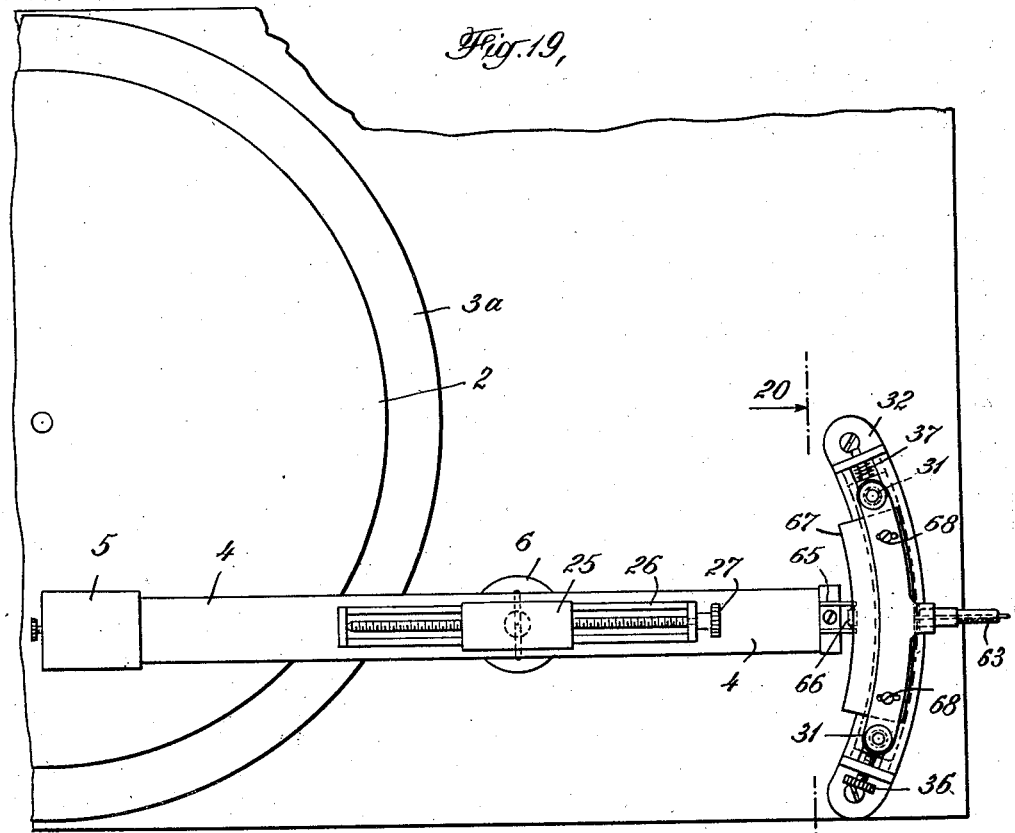
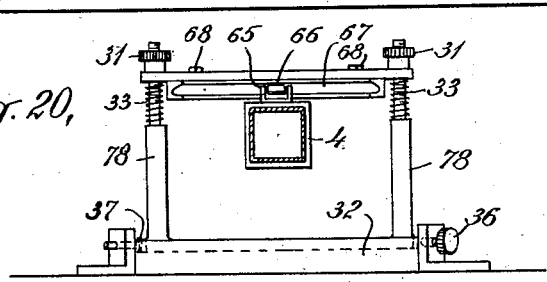

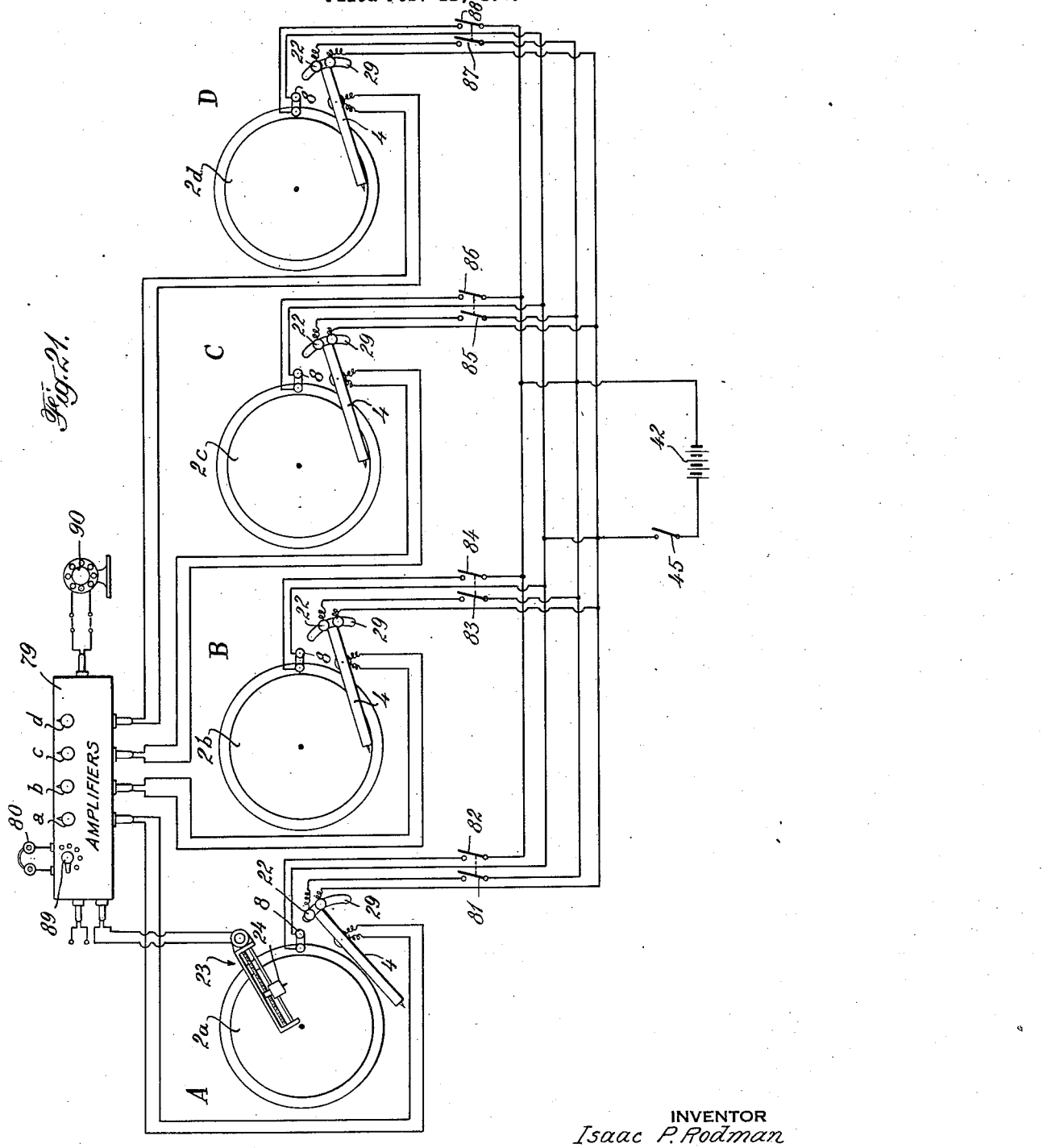

UNITED STATES PATENT OFFICE 2,426,241

PHONOGRAPH RECORDING AND REPRODUCING SYSTEM

Isaac P. Rodman, Cambridge, Mass., assignor to Columbia Recording Corporation, New York, N. Y., a corporation of Delaware Application February 11, 1943, Serial No. 475,529

18 Claims. (Cl. 274—13)

This invention relates to phonograph recording and reproducing apparatus and systems, and more particularly to such systems adapted for transcribing recorded matter to a record blank from one or more other records.

While the invention is applicable to phonograph apparatus in general, its chief value is in making practicable and convenient the recording in any desired order on a record blank of excerpts from several other records, which excerpts may or may not be interspersed with portions recorded concurrently from a microphone, without any undesired break in the continuity of the recording. To this end the invention includes remote control means whereby the several records may be instantly stopped and started individually or simultaneously, by which the phonograph pick-up devices may be lifted from the sound grooves and replaced again either separately or simultaneously, and means for moving the pickup device over one or more sound grooves of the record, as desired, with great accuracy.

In the past, devices for stopping and starting the rotation of phonograph records have been proposed, but they are not adapted to the purposes of the present invention, either because they are not sufficiently flexible in their controls, are not suitable for remote control, are unreliable in operation, or are too slow in stopping or starting rotation of the record.

Because of the fact that even with the present invention a fraction of a revolution of the turntable is required to bring the record up to normal speed, the pickup stylus must be set back on the record a distance corresponding to that traversed by the stylus while the record is attaining normal speed. To facilitate this compensation the invention includes a pickup-arm lifting device which automatically raises as many of the pickups as desired, each a previously adjusted distance from the bottom of the record groove. It has been found that if this distance is just enough to allow the stylus to touch the top of the groove as it swings across it, but without damage to the record, a click will be heard in the monitoring operator's headphones, indicating that one groove has been crossed. For this purpose a horizontal micrometer adjustment is provided by which the stylus may be moved across the record one groove at a time. The operation of moving the stylus to a particular point on the record and starting the reproduction from there is sometimes known as "cueing."

For a better understanding of the invention reference is made to the drawings in which:

Fig. 1 is an elevational view of an embodiment of the invention which is electrically actuated;

Fig. 2 is a modification of the arrangement of Fig. 1;

Figs. 3, 4 and 5 illustrate a second modification of the arrangement of Fig. 1, Fig. 4 being a sectional view along the line 4—4 of Fig. 3, and Fig. 5 being a sectional view along the line 5—5 of Fig. 4;

Fig. 6 is a top view of an electrically actuated embodiment of the invention, and may be considered to include the arrangements shown in Figs. 1–5, inclusive, and in more detail the lifting device for the pickup arm;

Fig. 7 illustrates the apparatus of Fig. 6 in elevation, this being a sectional view taken along line 7—7 of Fig. 6;

Figs. 8 and 9 show details of certain adjustment features included in the arrangement of Figs. 6 and 7, these figures being sections through lines 8—8 and 9—9, respectively, of Fig. 6;

Fig. 10 is a detail view of a pole-face of the electromagnets shown in Figs. 1, 6, 7, 11 and 12;

Figs. 11 and 12 are elevational and top views, respectively, of a modification of the embodiment of Fig. 6;

Fig. 13 illustrates the relation of a pickup stylus to the groove of a phonograph record, when the stylus has been raised out of playing position in accordance with the invention;

Fig. 14 is a wiring diagram of the electrical circuit connections included in the arrangements of the preceding figures;

Figs. 15 and 16 are elevational and top views, respectively, of a pneumatically actuated embodiment of the invention;

Fig. 17 is an elevational view of a mechanically actuated embodiment of the invention;

Figs. 18 and 19 are elevational and top views, respectively, of an alternative modification of the mechanically actuated arrangement of Fig. 17;

Fig. 20 is a sectional view taken along line 20—20 of Fig. 19; and

Fig. 21 is a schematic diagram of a complete reproducing and recording system which includes the features of the invention.

Referring now to the embodiment of Fig. 1, on a baseboard 7 is mounted a turntable 1 suitably driven, and on the turntable is shown a phonograph record 2 of the disc type. Between the record 2 and turntable 1 is a light-weight friction or driving disc 3 which may be of any suitable material, thick blotting paper having been found satisfactory. Thus by virtue of the two friction surfaces of disc 3, rotation of turntable 1 causes the rotation of record 2. To reproduce the recorded matter on the record, a pickup 5 attached to one end of a pickup arm 4 pivoted and supported on a swivel base 6 is provided in the customary manner. The pickup arm may be fitted with an adjustable counterweight, as will be described in connection with Fig. 6.

If, when the turntable is rotating, the rotation of disc 3 is suddenly stopped the turntable will continue to rotate at normal speed, if the turntable possess sufficiently high inertia, but the rotation of the lighter record 2 will be stopped.

The electrically actuated device in accordance with the invention is shown at the right of Fig. 1 and provides means for instantaneously stopping and very quickly starting rotation of the record. This device includes two electromagnets 8 supported by a magnet frame 9 which is adjustably secured to a bracket 10. The upper ends of the magnet poles are magnetically coupled together by an iron core strap 11. The lower end of the pole-piece of the right-hand or outside magnet terminates in a pole-face 12 to which is secured an iron pivot block 13. To the bottom of this pivot block is fastened a stop plate 14 carrying an adjustable stop screw 15. Hinged in pivot block 13 is a movable clamp member and armature 16 having at its free end a movable clamp face 17. Cooperating with this movable clamp face is a stationary clamp face 18 secured to the bottom of the left-hand or inner magnet. Armature 16 and clamp faces 17 and 18 should be made from magnetic material, such as soft iron. As is shown by the drawing, the friction disc 3 is of greater diameter than the record and the turntable, and the extension portion 3a of the disc passes between the two clamp faces 17 and 18. Vertical adjustment of frame 9 with respect to bracket 10 and adjustment of screw 15 allow the proper positioning of the clamping means 17, 18 with respect to the friction disc extension 3a.

When suitable electric current is caused to flow through magnets 8, armature 16 is instantly drawn up and the clamp faces grip the two surfaces of extension edge 3a of disc 3 causing it and the record 2 which it carries to stop instantly. Turntable 1 will, of course, continue to rotate, and therefore when the magnetic circuit is broken the clamp faces 17 and 18 immediately separate, releasing the friction disc 3 and allowing the record to rotate with the turntable. Inasmuch as the turntable has, during this time, been rotating at normal speed the release of friction disc 3 will allow the record to assume normal speed in not more than about one-half revolution of the turntable. Movable clamp face 17 may be caused to release more rapidly if a restoring spring 69 be arranged to pull it away from the fixed face 18. The function of lifting magnet 22 and of its associated components will be described in connection with Figs. 6–9.

The modification illustrated in Fig. 2 is generally similar to that of Fig. 1. In this arrangement, however, the friction disc 3 is of non-magnetic material such as hard brass, aluminum, or suitable plastic, and on either side of it is a sheet of friction material such as felt, each of these felt strips 20 and 21 being cemented to a surface of the disc 3, thereby forming a light-weight friction disc. Alternatively, the upper felt may be cemented to the disc 3 and the lower felt 21 may be cemented to the upper surface of turntable 1. When the friction disc extension is smooth, it is preferable to increase the coefficient of friction of the clamp faces 17 and 18, such as by covering them with a surface of soft rubber 19, as in Fig. 2.

In the modification of Figs. 3, 4 and 5, the use of the metal or plastic friction disc is retained, but here the coefficient of friction is increased, not by the use of a rubber facing on the clamps, but by providing fine radial corrugations on the extension face 3a of the disc 3 and by providing complementary corrugations on the adjacent surfaces of the clamp faces 17 and 18. This construction is shown clearly in Figs. 3 and 5, and results in a very positive action. The operation of the modifications of Figs. 2 and 3–5 is substantially the same as that of Fig. 1. It will be evident, however, that a friction disc 3 of metal or the like will be more durable than will one of softer material such as the blotting paper represented in Fig. 1.

Figs. 6 and 7 show the principal components of the invention, including a record 2 on the turntable, friction disc extension 3a, stop magnets 8 and cooperating mechanism and pickup arm 4 with its associated components. Also in Fig. 6 is represented generally a recording head 23, including cutter 24. This recording head need not be further described because the construction thereof is not a part of the present invention. It should be noted, however, that the present invention includes in combination suitable recording means with the novel structures herein described, it being understood that the recording head may be associated with a separate turntable and that it may be combined in a system including several reproducing units each having a turntable and a pickup arm including a record-stopping device and lifting mechanism, all independently and jointly controllable in accordance with the present invention. Such a system is shown in Fig. 21.

At the end of the pickup arm opposite pickup 5 is an adjustable lifting device for the pickup arm which may be operated simultaneously with or independently of the record-stopping mechanism. As previously indicated, it is usually necessary in connection with the cueing operation to set the pickup back at least a fraction of a revolution of the record before starting recording or reproducing because it requires about one-half revolution of the turntable to bring the record up to normal speed after the stopping device is released, although this fraction will vary with the weight of the blank or record. The mechanism provided in accordance with the present invention allows this to be done conveniently and with considerable precision. For example, if it be desired to set the pickup back one-half turn of the record, with the record stopped and the turntable revolving, the pickup arm is moved by the micrometer adjustment sideways in the correct direction one groove. Then the record-stopping mechanism is released only for an instant or so and the record will turn a fraction of a revolution at which point the pickup arm may be placed on the record by means of the pickup arm control. With experience in manipulating these two controls the operator will be able to place the pickup at any point desired. In practice, this cueing operation sometimes involves the setting back of the cutting stylus or the pickup from one-quarter turn to two turns of the blank or record, as the case may be.

The lifting device for the pickup arm, as shown in Figs. 6–10, includes a pair of electromagnets 22 secured to the end of the arm 4. The lower ends of the pole-pieces of these magnets should preferably be faced with a non-magnetic material such as brass or copper to prevent the armature which cooperates therewith from sticking to the pole-pieces. A suitable non-magnetic insert 28 is shown in Fig. 10.

Cooperating with lifting magnets 22 is an armature strip 29 of magnetic material, such as soft iron, shaped in an arc of which the pivot of arm 4 is the center. By this means the lifting magnets are always above a section of the armature strip as the pickup swings from the outside to the inside of the record, for example. This strip 29 is supported near each end on a post 30 threaded with fine threads at the top and secured at the bottom in a bed-plate 32, the bed-plate being secured in turn to a baseboard 7. On the threaded portions of posts 30 are micrometer thumb nuts 31 which press armature strip 29 against stiff compression springs 33. The turning of thumb nuts 31 effects a fine adjustment of the gap or spacing between armature strip 29 and pole-face 28, which results in an adjustment of the distance over which pickup stylus 24 is raised when magnets 22 are energized. In practice it has been found preferable to adjust this gap so as to raise the stylus just to the top of the record groove as shown in Fig. 13. By so doing, when the stylus is slowly swung across the top of a groove in the record it will just touch the top of the groove and cause a click to be heard in the monitoring operator's headphones or loudspeaker. Thus by counting the clicks he can ascertain that the stylus has been set back, or ahead, exactly the desired number of grooves.

The mechanism by which the stylus may readily be moved just one groove at a time is illustrated in Figs. 6 and 9, from which it will be seen that the supporting posts 30 are secured in a rail 35 which slides in a dovetail track formed in the top of bed-plate 32. This rail is caused to slide by adjustment of thumb screw 36. Movement of rail 35 by adjustment of screw 36 is against a compression spring 37 arranged at the opposite end of bed-plate 32. This provides an accurate, micrometer adjustment in either horizontal direction.

In Figs. 6 and 7 is shown an adjustable counterweight which was omitted from Fig. 1 to avoid unnecessary complication in the drawing, but which should be understood to be included in apparatus. This counterweight 25 may take any one of several forms, but that shown is simple and practical for the present purpose. It comprises, as shown, a weight 25 movable in a guide 26 by rotation of the screw 27, the guide frame being secured to the top of arm 4. This counterweight, by being movable across the pivot at swivel 6, can be adjusted so as to add to or subtract from the effective pressure of the pickup stylus 34 on the record surface, as may be required.

The modification shown in Figs. 11 and 12 reverses the positions of the lifting magnets and cooperating armature with respect to the ends of the pickup arm and with respect to each other. The lifting magnets 22 are here supported on a bracket 38 which should be of sturdy construction and rigidly fixed to the baseboard 7. In this arrangement, as will be observed from the drawings, the armature strip 29 is secured to the pickup arm just behind the pickup 5 and thus considerably less weight is added to the pickup arm assembly than in the case of the arrangement of Figs. 1-9. However, it has been found that in devices of this type an adjustable counterweight such as that just described would be required. A counter-balance of the spring type could, of course, be substituted in this as well as in the other arrangements disclosed herein.

In this arrangement the vertical adjustment is attained by sliding the magnets 22 vertically in a square frame 39 by means of a thumb nut 31 which turns a micrometer screw threaded through the core strip. Horizontal adjustment of the pickup arm and hence of the stylus is here attained by adjusting means which is equivalent to that of Figs. 6-9. This adjustment is effected by providing a yoke 40 at the upper end of bracket 38, and in this yoke is formed a dovetail-shaped track in which slide piece 41 is caused to slide back and forth, by adjustment of screw 36 against the tension of compression spring 37 as in the former arrangement. Slide piece 41 may be formed integrally with frame 39. It is to be understood that any of the record-stopping devices above described may be employed in connection with the arrangement of Figs. 11 and 12.

Fig. 14 is a simplified circuit diagram of electrical connections which may be used to actuate the embodiments of the invention shown in Figs. 1-12, inclusive. This diagram represents the stop magnets 8 and lifting magnet 22 connected in parallel with a suitable source of electric current such as a battery 42. In circuit with stop magnets 8 is a control switch 43 and in circuit with lift-up magnets 22 is a control switch 44. The master switch 45 connected in series with battery 42 must be closed to actuate either or both of the sets of magnets as determined by the positions of switches 43 and 44, respectively. Thus by first closing either or both of switches 43 and 44, the closing and opening of switch 45 will effect the desired operation of the apparatus. If more than one turntable be employed, as would usually be the case in connection with transcription recording, the arrangement of Fig. 21 may be followed.

The modification of the invention illustrated in Figs. 15 and 16 is actuated pneumatically instead of electrically, but broadly this embodiment corresponds to that of Figs. 11 and 12. The record stopping and starting mechanism comprises a clamp stand 46 having a stationary upper arm and a movable lower arm 16. To the upper arm is secured a stationary clamp face 18, and to the lower arm a movable clamp face 17 as in the previous arrangements. These clamp faces are positioned so as to grip the extension 3a of friction disc 3. Adjusting screw 47 is provided to place the stationary clamping face 18 in proper position with respect to extension 3a of the friction disc. In this embodiment no vertical adjustment of clamp face 17 is usually required, but such an adjustment may readily be provided.

The movable clamp member or arm 16 is actuated by an external piston 50 which surrounds a stationary cylinder 51. To the upper end of cylinder 51 is attached a pneumatic tube 49 which communicates with a compression bulb 48. The clamp 17, 18 is normally held open by compression spring 69. As is evident from the drawing, pneumatic pressure in tube 49 forces piston 50 downward and thus raises clamp face 17 against face 18 and thereby clamps extension 3a tightly.

The mechanism by which the pickup arm is automatically lifted up a predetermined distance comprises a curved bracket 55 which supports a pair of upper stop-supporting arms 57. These arms carry an upper or stop plate 52 which is adjustable vertically by means of screws 56 and thus the distance the pickup is lifted is determined. Beneath the stop plate 52 is a lifting plate 53 of substantially the same size and shape, both plates preferably being formed in an arc of which the supporting pivot of pickup arm 4 is the center. In order to lift the pickup arm 4 a lifting lug 54 is secured to the arm immediately behind the pickup 5 and is shaped to cooperate with lift plate 53 and stop plate 52. Lift plate 53 is actuated by a lifting arm 64 which in turn is actuated by piston 50 and cylinder 51, as described in connection with the clamping mechanism. This lifting device is connected by another pneumatic tube 49 to the compression bulb 48, so that compression of the bulb 48 simultaneously actuates both the pickup arm lifting device and the record-stopping device. Should it be desired that only one of these devices be actuated, a pinch valve or clamp, such as shown at 70, may be applied to the appropriate branch 49, or to each branch, of the pneumatic tubing.

Pinch valve 70 is provided to maintain the compression in the system for longer intervals than would be convenient by the continued compression of bulb 48. It is sometimes more convenient to actuate the compression bulb 48 by a pedal in order to leave the hands of the operator free. Furthermore, it will be evident to those skilled in the art that the system of Figs. 15 and 16 can readily be adapted to hydraulic operation, if desired. In this connection it is to be understood that in the appended claims the term "pneumatic" is intended broadly to include equivalent hydraulic actuation.

In the embodiment of Figs. 15 and 16 a micrometer adjustment corresponding to that of Figs. 7 and 9, for moving the pickup stylus accurately one groove at a time across the record is provided in the form of a bed-plate 71, accommodating a dovetail-shaped slide member 72 which slides in a track cut in the bed-plate. The sliding motion of member 72 is effected by thumb screw 36 which passes through a threaded hole in the base 71 of bracket 55. Additional devices as in Figs. 15, 16, associated with additional turntables may be simultaneously actuated by pneumatic connection to bulb 48 after the manner of Fig. 21. It will be clear from the foregoing that a modification of the lifting device corresponding to that of Figs. 6–7, but pneumatically actuated, may readily be constructed. To accomplish this it is merely necessary to secure lug 54 to the other end of arm 4, relocate bracket 55, and interchange the movable and stationary arms 64 and 57.

The embodiments of the invention illustrated in Figs. 17 to 20, inclusive, are shown to be mechanically actuated by a flexible wire, sometimes called a Bowdin wire. Referring to Fig. 17, the record-stoping device and the pick-up arm lifting device are quite similar to those just above described in connection with Figs. 15 and 16, and thus the corresponding components of this modification which bear corresponding reference characters need not be again described. In this mechanically actuated arrangement the Bowdin wires 63 within their flexible sheaths move connecting links 73 which in each case are pinned to movable arms 16 and 64, respectively.

The two Bowdin wires, and hence the devices which they control, are arranged to be actuated simultaneously by the cam mechanism shown at the right of Fig. 17. This mechanism includes a frame or casing 62 through opposite ends of which the Bowdin wires pass. At the end of each Bowdin wire is a knob-shaped cam follower 60 which is urged toward the center of the casing by a compression spring 61. In the center of frame 62 a double cam 59 is pivoted so that an opposing cam face cooperates respectively with each of the followers. Cam 59, in turn, is rotated by pressing plunger head 58 against a spring 74. When it is desired to retain both devices in their actuated positions, plunger 58 may be rotated slightly while in its depressed position so that projecting lug 75 thereon engages a catch 76 secured to the finger bar 77.

The embodiment of the invention illustrated in Figs. 18, 19 and 20 is also actuated by Bowdin wires, as in Fig. 17, but the pick-up arm lifting device is located at the end of the pickup arm after the manner of the electrically actuated pickup device of Figs. 6 and 7. The record-stopping device shown in Fig. 17 has been omitted from these figures to simplify the drawings, but should be considered to be included in the apparatus. Here Bowdin wire 63 actuates a groove cam 67. This cam, like plate 29 of Fig. 6, is formed in the shape of an arc of which the supporting pivot of pickup arm 4 is the center. Suitable slots in the cam permit it to slide over the guide pins 68. As shown in Fig. 18, the faces of this cam slant downwardly so that as the cam advances toward cam roller 66, which is supported in a bracket 65 on the end of the pickup arm 4, the roller and consequently the end of the pickup arm, is urged downward, thus raising stylus 24. Sufficient play should be provided between the respective faces of the cam and the sides of roller 66 to allow normal movement of the end of the pickup arm as it follows the undulations of the record surface.

The cam mechanism just described is supported on two posts 78 which are secured in bedplate 32, as shown in Fig. 20. The upper portions of the posts are threaded, and on the threads adjusting nuts are provided. By turning nuts 31 against stiff compression spring 33, the cam may be adjusted vertically. When the pickup is in the raised position it may be moved from one groove to the next by horizontal adjustment screw 36 which causes rail 35 to slide in a dovetail-shaped track in bed-plate 32 in the manner described in connection with Figs. 6 and 9. A counterweight and adjusting mechanism therefor similar to those of Figs. 6 and 7 are shown in connection with the embodiment of Figs. 18 and 19. A similar counterweight may be understood to be provided in the embodiment of Figs. 15, 16 and 17, although for clarity it has been omitted from the drawings.

In Fig. 21 is illustrated a complete phonographic reproducing and recording system incorporating the present invention. The system illustrated includes three reproducing stations B, C and D, and one recording station A. The latter includes also reproducing equipment. Any number of recording and reproducing stations could be similarly employed, as desired. Each station includes a pickup 4 and lifting devices 22, 29 and a stopping device 8. The lifting devices are individually controlled by switches 81, 83, 85, 87, respectively, and the stopping devices are individually controlled by switches 82, 84, 86, 88, respectively. A master switch 45 controls all of the circuits simultaneously, and battery 42 represents the electric power source which may comprise any suitable source of current. The turntables which rotate the records 2a, 2b, 2c and 2d are individually controlled and are operated by suitable electric motors, not shown. All nine of the switches referred to may be of the key or telephone type, and the pairs of switches 81—82, 83—84, etc. should be positioned so that both switches of each pair may be thrown individually or simultaneously, as is indicated by the dotted lines between them. Furthermore, any desired pairs of switches may be uni-controlled by coupling them with a throw-bar.

Cabinet 79 contains a separate vacuum tube amplifier for each reproducer—and for each recorder, if required. Each amplifier has its own controls of the usual type, knobs *a*, *b*, *c* and *d* representing, respectively, volume controls for each station, so that, for example, the outputs from pickups 4 of stations B and D may be amplified to different degrees before reaching recorder 23. Suitable plugs and jacks are used for interchangeably connecting the various circuits to the amplifiers. Headphones or loudspeaker 80 are provided for the monitoring operator, and a switching device 89 connects the phones selectively to the recording channel, to the output of any one of the stations or to the circuit of microphone 90.

Operation

The following description will make more clear the operation of the system. Assume that an announcer is at the microphone 90, that a record (2*b*, 2*c*, and 2*d*) having one or more desired excerpts is on each of the turntables, that a blank 2*a* is on the recording turntable, and that all turntables are rotating. Switches 83 and 88 and master 45 should first be closed, the cutter 24 placed at the start of the blank and the several styli placed at the beginning of the selected excerpts. Say a musical excerpt is first to be transferred from record 2*b*; the cutter is first started and switches 83 and 84 opened which causes the first excerpt to be transcribed. At the conclusion of the first excerpt switches 83—84 are closed and the microphone circuit closed to record an announcement, for example. At the conclusion of the announcement the second excerpt from record 2*d* is transferred by opening switches 87—88. At the conclusion of the second excerpt switches 87—88 are closed and switches 85—86 simultaneously opened to transfer the third excerpt from record 2*c*, after which switches 85—86 are closed and a fourth excerpt transferred from another portion of record 2*d* by opening switches 83—84. In the latter case the stylus of station B would meanwhile have been placed at the beginning of the desired fourth excerpt. At the conclusion of the fourth excerpt, switches 83—84 would be closed and the microphone again connected for a concluding announcement, for example, after which the recorder would be lifted and switch 82 closed to stop rotation of record 2*a*. The pickup at station A may be used to play back the record just made. Obviously the microphone may be connected for recording simultaneously with the recording transcribed from any of the other records, or two excerpts may be transcribed simultaneously, if it be desired to combine a voice from one record and a musical accompaniment from another, for instance. Whatever the selected arrangement of transcribing and recording may be, the devices and controls of the present invention provide an extremely flexible and convenient system wherein it is possible to carry out the transcribing and direct pickup recording processes without delays between the various portions, or if delays are intended, then without any perceptible break in the continuity of the recording because the recording and reproducing processes may be started and stopped instantaneously and simultaneously.

What is claimed is:

1. A phonographic transcribing system comprising a recording turntable and a plurality of reproducing turntables, a recording device associated with said recording turntable, a pickup arm associated with each reproducing turntable, lifting means associated with each of said pickup arms adjustable to lift each said arm vertically a predetermined distance, a friction disc on each reproducing turntable having an annular portion extending beyond the edge of the turntable, stopping means coacting with opposite sides of said annular portion operable to grip and release the same, unicontrol means connected to said lifting means by which a plurality of said pickup arms may be lifted or dropped simultaneously, and unicontrol means connected to said stopping means by which a plurality of said stopping means may be actuated simultaneously.

2. A phonographic transcribing system comprising a recording turntable and a plurality of reproducing turntables, a recording device associated with said recording turntable, a pickup associated with each reproducing turntable, lifting means associated with each of said pickups adjustable to lift each said pickup vertically a predetermined distance, a friction disc on each reproducing turntable having an annular portion extending beyond the edge of the turntable, stopping means coacting with said annular portion operable to grip and release the same, unicontrol means connected to said lifting means by which a plurality of said pickups may be lifted or dropped simultaneously, and unicontrol means connected to said stopping means by which a plurality of said stopping means may be actuated simultaneously.

3. A phonographic transcribing system comprising a recording turntable and a plurality of reproducing turntables, a recording device associated with said recording turntable, a pickup associated with each reproducing turntable, lifting means associated with each of said pickups adjustable to lift each said pickup vertically a predetermined distance, a friction disc on each reproducing turntable having an annular portion extending beyond the edge of the turntable, stopping means coacting with said annular portion operable to grip and release the same, and selective control means connected with said lifting means and with said stopping means by which any pair or any combination of pairs of lifting means and stopping means may be actuated simultaneously.

4. A phonographic transcribing system comprising a recording turntable and a plurality of record-reproducing turntables, a recording device associated with said recording turntable, a pickup associated with each reproducing turntable, lifting means for lifting each of said pickups with respect to the record with which it is associated, adjustable means mechanically cooperating with said lifting means for predetermining the distance each said pickup is lifted by said lifting means, a friction disc on each turntable having an annular portion extending beyond the edge of the turntable, stopping means coacting with the annular portion of each disc operable to grip and release the same, and selective remote control means connected to said lifting means and to said stopping means by which any one or combination of said lifting means and said stopping means may be actuated simultaneously from a remote point.

5. In phonograph apparatus, a turntable having high effective inertia, a disc record thereon, a friction disc of relatively low inertia and having two friction surfaces placed one surface adjacent said turntable and the other surface adjacent said record, each friction surface having a contact area approximately the same as the area of the adjacent surface, an annular extension on said friction disc, stopping means including two gripping faces one of which is stationary and the other of which is movable toward and away from said extension, said faces being located one on each side of said extension to grip and release the same, and means remotely operable to actuate said movable gripping face whereby the rotation of said friction disc and of said record may be stopped instantly and started quickly.

6. In phonograph apparatus, a turntable having high effective inertia, a friction disc of relatively low inertia located on top of said turntable for driving a disc record placed on said friction disc, the friction area of said disc being at least as great as the adjacent area of the record which it drives, the diameter of said fraction disc being greater than that of said turntable whereby to form an annular extension, stopping means including two gripping faces one of which is stationary and the other of which is movable toward and away from said extension, said faces being located one on each side of said extension to grip and release the same, and means remotely operable to draw together and to separate said faces, whereby the rotation of said friction disc and hence of a record thereon may be stopped instantly and started quickly.

7. In phonograph apparatus, a turntable having high effective inertia, a friction disc of relatively low inertia located on top of said turntable for driving a disc record placed on said friction disc, the diameter of said friction disc being greater than that of said turntable whereby to form an annular extension, stopping means including two gripping faces one of which is stationary and the other of which is movable toward and away from said extension, said faces being located one on each side of said extension to grip and release the same and having surfaces of high coefficient of friction with respect to the surfaces of said extension, and means remotely operable to draw together and to separate said faces, whereby the rotation of said friction disc and hence of a record thereon may be stopped instantly and started quickly.

8. Apparatus according to claim 7 wherein said annular extension is provided with radial corrugations and the surfaces of said gripping faces are provided with complementary corrugations.

9. In phonograph apparatus, a rotating turntable having high effective inertia, a driving disc of relatively low inertia located on top of said turntable for driving a record placed on said driving disc, a surface of relatively high coefficient of friction on each side of said driving disc, said surfaces being of a diameter less than that of said disc, the diameter of said disc being greater than that of said turntable whereby to form an annular extension, stopping means including two gripping faces one of which is stationary and the other of which is movable toward and away from said extension, said faces being located one on each side of said extension, and means remotely operable to draw together and to separate said faces, whereby the rotation of said driving disc and hence of a record thereon may be quickly stopped and started.

10. In phonographic apparatus, the combination with a rotating turntable having high effective inertia, of a driving disc of relatively low inertia, means for normally maintaining said disc in driving engagement with a record, means normally maintaining said turntable in driving engagement with said disc, an annular portion of said disc extending beyond said turntable, two gripping members one of which is stationary and the other of which is movable toward and away from said annular portion, said gripping members being located one on each side of said annular portion, said annular portion presenting a surface of high coefficient of friction with respect to said members, and means remotely operable to move said movable member so as to grip or to release said annular portion, whereby the rotation of said driving disc and hence of a record thereon may be quickly stopped and started.

11. In apparatus according to claim 10, means for adjusting both of said members with respect to said extension when said members are in said released position.

12. In phonographic apparatus, the combination with a rotating turntable having high effective inertia, of a friction disc positioned on top of said turntable for driving a record placed on said disc, the diameter of said disc being greater than that of said turntable whereby to form an annular extension, stopping means including a pair of electromagnets having cores and being positioned on a radial line with respect to said disc, the inside one of said magnets being secured above said extension and having a gripping face positioned adjacent the upper side of said extension, the core of the outside one of said magnets being magnetically coupled at its upper end to the upper end of the core of said inner magnet and at its lower end having a pivot block secured thereto, an armature of magnetic material pivoted at one end in said pivot block and bearing at its other end a movable gripping member, said movable gripping member being positioned below and adjacent the under side of said extension, and means for adjusting the spacing between said gripping faces and said extension.

13. In phonographic apparatus, a baseboard, a turntable, a pickup arm mounted by a pivot on said baseboard, said turntable being adapted to rotate a record placed thereon, said pickup arm having at one end a pickup cooperating with said record, a lifting device comprising a lifting lug secured to said arm at the pickup side of said pivot and an arc-shaped stop plate and an arc-shaped lift plate vertically spaced from each other and supported on a bracket secured to said baseboard, a lifting arm attached to said lift plate, a cylinder and a piston therefor movable with respect to each other, a movable one of said piston and cylinder being linked to said lifting arm to actuate the same whereby to lift said lug, pneumatic means operable to actuate said piston and cylinder, micrometer means associated with one of said plates for adjusting the distance said arm is lifted by actuation of said lifting device, and micrometer means associated with said bracket for moving at least a part of said bracket with respect to said baseboard whereby to move said pickup a small distance across said record while said lifting device is actuated.

14. In combination with apparatus according to claim 13, a record-stopping device comprising a friction disc positioned between said record and said turntable, the diameter of said disc being greater than that of said turntable whereby to form an annular extension, a clamp stand supported on said baseboard having a movable portion and a stationary portion, a clamp face on each said portion located one on each side of said extension, a piston and a cooperating cylinder movable with respect to each other, a movable one of said piston and cylinder being linked to said movable portion to actuate the same whereby to draw said clamp faces together against said extension, micrometer means for manually moving at least one of said clamp faces with respect to said extension, and pneumatic means operable to actuate said stopping device simultaneously with said lifting device.

15. In phonographic cueing apparatus, the combination with a record having grooves of a certain depth, of a baseboard, a turntable, said turntable being adapted to rotate said record placed thereon, a pickup arm mounted by a vertical pivot on said baseboard, said pickup arm being also pivoted intermediate its two ends by a pivot horizontal to said baseboard, one of the ends of said pickup arm being fitted with a pickup adapted to carry a stylus cooperating with said record, an automatic lifting device comprising an electromagnet mounted near the other end of said pickup arm, the core in said electromagnet having one end exposed in a direction toward said baseboard, an arc-shaped flat armature strip of magnetic material movably supported on said baseboard substantially parallel thereto so as to cooperate with the core of said electromagnet as it swings thereover and to constitute stop means against which said core end strikes upon actuation of said electromagnet, and micrometer means attached to said baseboard and said armature to move said armature for adjusting the spacing between said baseboard and said armature whereby the distance said stylus is lifted by actuation of said lifting device may be limited to a distance substantially equal to the depth of said grooves.

16. In phonographic cueing apparatus, the combination with a record having grooves of a certain depth, of a baseboard, a turntable, said turntable being adapted to rotate said record placed thereon, a pickup arm mounted by a vertical pivot on said baseboard, said pickup arm being also pivoted intermediate its two ends by a pivot horizontal to said baseboard, one of the ends of said pickup arm being fitted with a pickup adapted to carry a stylus cooperating with said record, an automatic lifting device comprising an electromagnet mounted near the other end of said pickup arm, the core in said electromagnet having one end exposed in a direction toward said baseboard, an arc-shaped flat armature strip of magnetic material movably supported on said baseboard substantially parallel thereto so as to cooperate with the core of said electromagnet as it swings thereover and to constitute stop means against which said core end strikes upon actuation of said electromagnet, a bed plate secured to said baseboard, an arc-shaped rail slidably mounted in said bed plate, first micrometer means attached to said armature and to said rail for adjusting the spacing between said baseboard and said armature so that the distance said stylus is lifted by actuation of said lifting device may be limited to a distance substantially equal to the depth of said grooves, and second micrometer means attached to said bed plate and said rail for moving said rail in an arcuate path parallel to the surface of said bed plate, so as to move said stylus in either direction laterally across the surface of said record in increments less than the width of one of said grooves when said armature is magnetically attracted to said electromagnet.

17. In phonographic cueing apparatus, a baseboard, a turntable, said turntable being adapted to rotate a grooved disc record placed thereon, a pickup arm having a pickup adapted to accommodate a stylus on one end positioned to cooperate with the grooves of said record, said arm being pivoted on said baseboard, a lifting device comprising a flat, arcuate armature strip of magnetic material secured to said arm near said pickup, substantially parallel to said baseboard, a bracket mounted on said baseboard, a frame at the end of said bracket, and an electromagnet supported in said frame above said armature in a position to magnetically cooperate with said armature at all positions of said arm as it moves across said record, and to comprise a stop against which said armature strikes to limit its upward movement when attracted by said electromagnet, said electromagnet being slidable in said frame perpendicular to said baseboard, and micrometer adjusting means for vertically adjusting the position of said electromagnet in said frame.

18. In phonographic cueing apparatus, a baseboard, a turntable, said turntable being adapted to rotate a grooved disc record placed thereon, a pickup arm having a pickup adapted to accommodate a stylus on one end positioned to cooperate with the grooves of said record, said arm being pivoted on said baseboard, a lifting device comprising a flat, arcuate armature strip of magnetic material secured to said arm near said pickup, substantially parallel to said baseboard, a bracket mounted on said baseboard and having a portion elevated above said pickup arm, an electromagnet supported by said portion of said bracket above said armature and positioned to magnetically attract said armature at all positions of said arm as it moves across the surface of said record, a plurality of movable means supporting said electromagnet on said portion of said bracket in two degrees of freedom mutually at right angles, and a plurality of micrometer adjusting devices for actuating said movable means so as respectively to accurately adjust the spacing between said electromagnet and said baseboard and to move said stylus in either direction laterally across the surface of said record in increments less than the width of one of said grooves when said armature is magnetically attracted to said electromagnet.

ISAAC P. RODMAN.

REFERENCES CITED

The following references are of record in the file of this patent:

UNITED STATES PATENTS

| Number | Name | Date |
|---|---|---|
| 1,810,062 | Taylor | June 16, 1931 |
| 1,798,196 | Dyer | Mar. 31, 1931 |
| 2,031,074 | Scheibell | Feb. 18, 1936 |
| 2,141,804 | Thompson et al. | Dec. 27, 1938 |
| 2,192,757 | Routin | Mar. 5, 1940 |
| 2,192,360 | Mann | Mar. 5, 1940 |
| 2,328,628 | Eddy | Sept. 7, 1943 |
| 1,998,105 | Sullivan | Apr. 16, 1935 |
| 2,082,261 | Runyan | June 1, 1937 |
| 1,654,824 | Mitchell | Jan. 3, 1928 |
| 2,352,778 | Eddy | July 4, 1944 |

FOREIGN PATENTS

| Number | Country | Date |
|---|---|---|
| 144,203 | Great Britain | June 10, 1920 |
| 370,094 | Great Britain | Apr. 7, 1932 |